United States Patent [19]
Nolte

[11] 3,745,825
[45] July 17, 1973

[54] APPARATUS FOR INTEGRATING AND RECORDING QUANTITY OF FLOW OF FLUID

[75] Inventor: Claude B. Nolte, Villanova, Pa.

[73] Assignee: Kingmann-White, Inc., Placentia, Calif.

[22] Filed: Oct. 13, 1971

[21] Appl. No.: 188,947

[52] U.S. Cl. .................................... 73/206, 73/211
[51] Int. Cl. ............................................. G01f 1/02
[58] Field of Search...................... 73/206, 211, 183

[56] References Cited
UNITED STATES PATENTS
1,892,183   12/1932   Gorrie................................. 73/206
3,322,339   5/1967    Nolte ............................. 73/206 X Primary Examiner—Richard C. Queisser
Assistant Examiner—John P. Beauchamp
Attorney—John W. Logan, Jr.

[57] ABSTRACT

Apparatus for integrating and recording total quantity of flow through a pipe line including a lever system which is caused to move in accordance with a first input of movement from a measurement of the static pressure within the pipe line and a second input of movement from a measurement of the differential pressure across a meter orifice within the pipe line. The two input of movements are multiplied by each other by the lever system providing a single output of movement which is registered on a cumulative counter that in turn indicates total quantity of flow through the pipe line over a period of time. When either the measurement of static pressure is zero or measurement of the differential pressure is zero, the lever system will not provide an output of movement to the cumulative counter. Additionally, when the measurement of differential pressure is zero a positive lock is provided to prevent registration of flow by the cumulative counter.

5 Claims, 6 Drawing Figures

PATENTED JUL 17 1973

APPARATUS FOR INTEGRATING AND RECORDING QUANTITY OF FLOW OF FLUID

The present invention relates to new and useful improvements in meters for integrating and recording total quantity of flow of fluid through a pipe line and more particularly to improvements in such meters which prevent the meters from recording flow when there is no flow in the pipe line.

In meters of this type for integrating and recording total flow of a fluid through a pipe line, a lever system is provided which has movement imparted to it from two separate sources. The first source of movement to the lever system is imparted from a signal representative of the measurement of static pressure within the pipe line while the second source of movement to the lever system is imparted from a signal generated by differential pressure, for example, across an orifice in the pipe line. This lever system multiplies the two signals or sources of movement it received and the total output of movement of the lever system, in turn, positions a rotary cam by means of a segmental gear interconnected with a pinion on a cam shaft. The position of the rotary cam is thus determined by both the static pressure in the pipe line and the differential pressure across an orifice in the pipe line or measurement of velocity of the fluid through the pipe line, these two measurements when integrated together providing a measurement of total quantity of flow through the pipe line over a period of time. The position of the rotary cam, in turn, is measured at short predetermined regular intervals, for example, by a clock-operated recording mechanism and the output of the recording mechanism indicates the total quantity of flow of fluid which has passed through the pipe line.

Theoretically, this lever system would be at the zero position when the differential pressure across an orifice in the pipe line is zero and thus, the rotary cam would be in its zero position causing the recording unit to record zero flow at the time the recording unit is actuated. However, the lever system and cam must be free to move readily upon the slightest force of input of movement to the lever system from both the measurement of the static pressure and the measurement of the differential pressure. Accordingly, it has been found that because of the slight play which must be present in the many pivot connections in the lever system and the slight play which must be present in the gear train for input of movement to the rotary cam from the lever system, that the rotary cam will not always be in its true zero position when the measurement of the differential pressure is zero. There is further additional play in the mechanical system which transmits the measurement of the position of the rotary cam to the recording unit. Thus, while integrating and recording units of this type are extremely accurate in the measurement of a high quantity of flow through a pipe line, they will, in some instances, give a recording of flow through the pipe line when no such flow exists. It is, therefore, an object of the present invention to provide improvements in meters of the above-described type which will prevent such meters form recording flow when the differential pressure reading of such meters is zero but will permit such meters to accurately record flow as soon as a recordable differential pressure exists across an orifice plate in the pipe line.

It is a further object of the present invention to provide mechanical means connected to the source of input to the meter system from the differential pressure measurement which may be interposed in the path of movement of the mechanism that records the position of the rotary cam so that the recording mechanism cannot take a measurement of the position of the rotary cam when the differential pressure measurement is zero, but is free to record the position of the rotary cam when a differential pressure exists across the orifice in the pipe line.

A still further object of the present invention is to provide novel apparatus of the above-described type which is fool-proof in operation and which may be manufactured and assembled easily and quickly.

These and other objects of the present invention and the various features and details of the operation and construction thereof are hereinafter more fully set forth and described with reference to the accompanying drawings in which.

Figure 1:
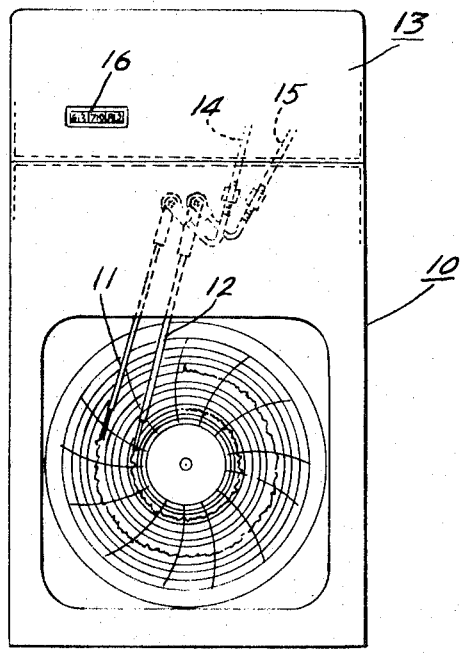
FIG. 1 is a reduced sized elevational view showing the general assembly of an encased integrating and recording apparatus embodying the present invention connected to a conventional orifice flow meter of the type employing circular charts.
Figure 5:
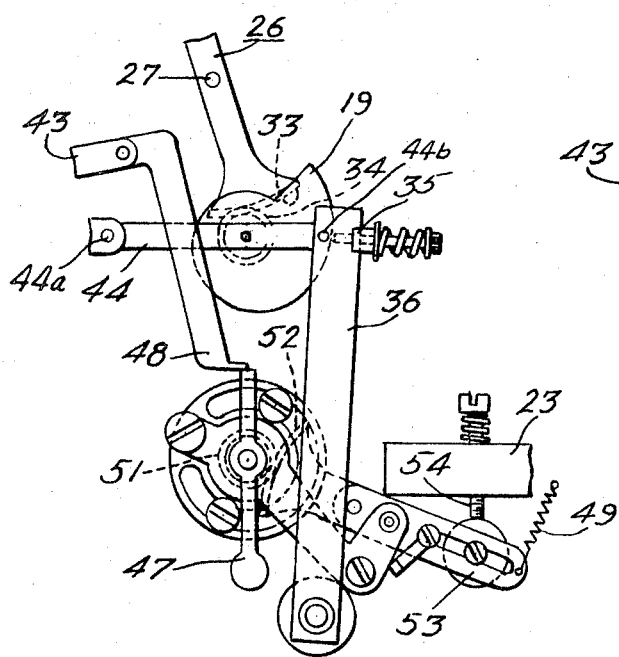
FIG. 5 is an enlarged fragmentary elevational view of the apparatus for preventing recording of flow by the recording unit when differential pressure across an orifice in a pipe line is zero.

In FIG. 1 there is illustrated a conventional orifice-type flow meter 10 adapted to measure and record on circular charts static pressure in a pipe line and differential pressure across the meter orifice in the pipe line. Static pressure is recorded on the chart of the flow meter 10 by the pen indicator 11 and differential pressure is recorded on the chart by the pen indicator 12, both of which are mounted on conventional pen shafts of the flow meter. It should be understood that for accurate measurement of flow of a compressible gas the reading of the differential pressure across the orifice plate of the meter should be compensated by variations in static pressure within the pipe line. Accordingly, flow meters of this type will record both the differential and static pressures.

The integrating and recording unit 13 of the present invention for recording total quantity of flow over a period of time is mounted directly on top of the flow meter 10. The pen indicators 11 and 12 are interconnected to the integrating and recording unit 13, as more fully described hereinafter, by means of adjustable connecting links 14 and 15, respectively, to transmit rotary motion from the pen shafts of the indcators 11 and 12 to the integrating portion of the integrating and recording unit. The recording portion of the integrating and recording unit indicates the total quantity of flow over a period of time on a cumulative counter 16 visible through an opening in the outer casing.

Figure 2:
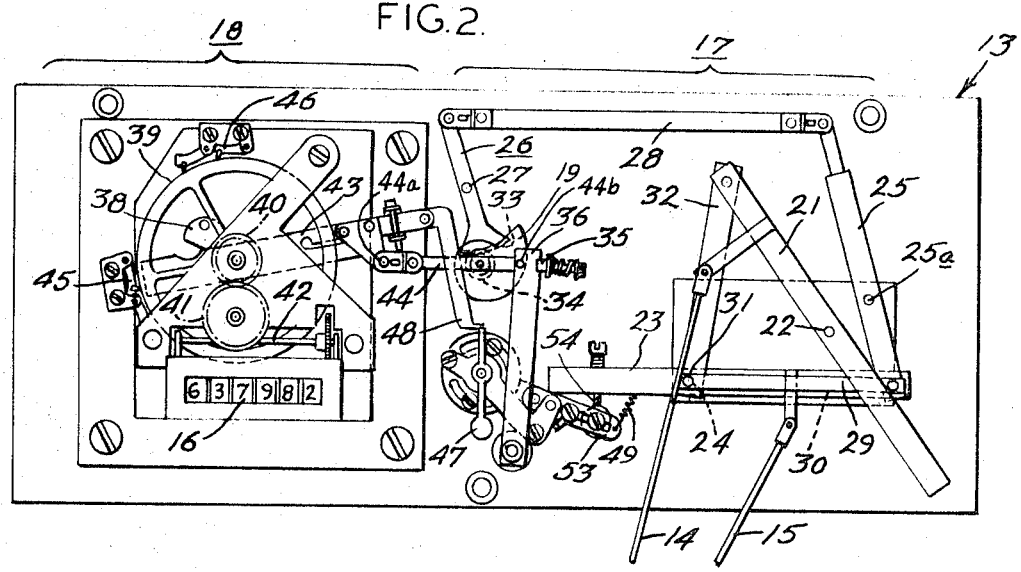
FIG. 2 is an enlarged elevational view of the integrating and recording system for multiplying and obtaining a function of static pressure and differential pressure across an orifice in a pipe line and transmitting this function to recording or totalizing apparatus.
Figure 3:
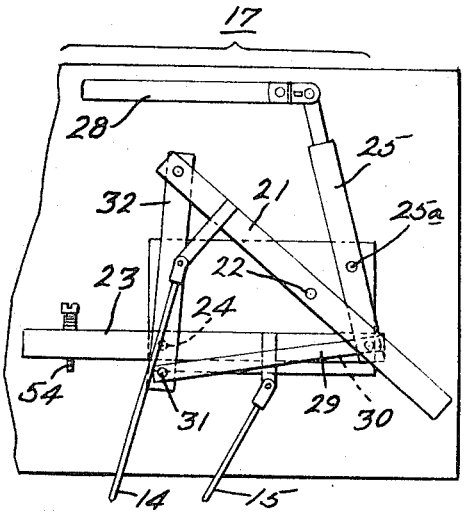
FIG. 3 is a fragmentary elevational view of the lever system of FIG. 2 moved out of the zero position.
Figure 4:
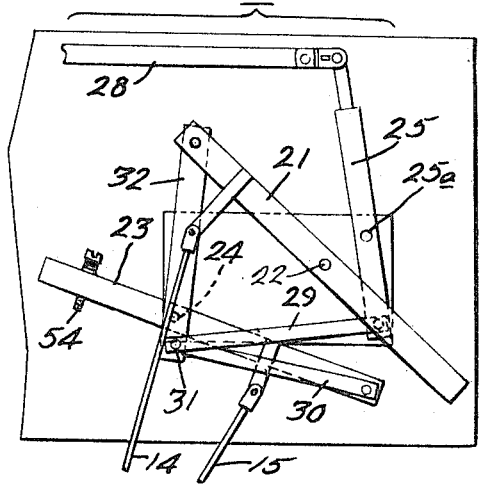
FIG. 4 is a view similar to FIG. 3 with the lever system in a different position.

Referring more specifically to the drawings and particularly FIGS. 2, 3 and 4 thereof, the integrating and recording unit 13 comprises an integrating or multiplying section 17 and a recording or totalizing section 18. The integrating or multiplying section 17 consists of a lever system more fully described hereinafter adapted to be moved by both connecting links 14 and 15 from the static pressure and differential pressure pen indicators. The lever system, in turn, controls the position of an archimedes cam 19. The position of the archimedes cam 19, in turn, controls the amount of movement to be imparted to the cumulative counter 16 by the recording or totalizing unit 18 as more fully described hereinafter, for recording the total quantity of flow over a period of time.

In FIG. 2, the lever system of the integrating or multiplying unit 17 is shown in a position with zero pressure differential across the orifice plate in the flow meter and zero static pressure or atmospheric pressure in the pipe line through which flow is being measured. In FIG. 3 the lever system is shown in a position with static pressure in the pipe line above normal atmospheric pressure but with zero differential pressure across the orifice plate. In FIG. 4 the lever system is shown in its normal position with flow through the pipe line, that is with a positive static pressure and the existence of differential pressure across the orifice plate.

As illustrated in the drawings, the static pressure connecting link 14 is connected to a static pressure lever 21 pivoted at its midpoint at 22 to the casing for the integrating and recording unit. The differential pressure connecting link 15 is interconnected with a differential pressure lever 23 which is pivoted at its midpoint at 24 to the casing. Movement of both the static pressure and differential pressure layers 21 and 23 is in turn transmitted to the lower end of a first motion transmitting lever 25 which is pivoted to the casing at 25a. This first motion transmitting lever 25 transmits similar motion to a second motion transmitting lever 26 pivoted at its midpoint as at 27 by means of a connecting link 28.

To transmit the motion to the first motion transmitting lever from the movement of the static pressure lever 21 and differential pressure lever 23 so that movement of one of the levers multiplies movement of the other lever and to prevent movement of the first motion transmitting lever 25 when either the static pressure lever 21 or differential pressure lever 23 is in its zero position, a pair of connecting links 29 and 30 of equal length are provided. The first connecting link 29 is pivoted at 31 to the lower end of a generally vertical extending connecting link 32 which in turn is pivoted to the upper end of the static pressure lever. The opposite end of the first connecting link 29 is pivotally connected to the lower end of the first motion transmitting lever 25. The second connecting link 30 has its one end pivotally connected to the pivot 31 of the connecting link 32 while its other end is pivotally connected to the extreme right-hand end of the differential pressure lever 23. When both the static pressure lever 21 and differential pressure lever 23 are in their zero position, the pivot 31 for the connecting links 29 and 30 is in alignment with the pivot connection 24 for the differential pressure lever 23 and the pivot connections for the opposite ends of the connecting links 29 and 30 overlie one another as shown in FIGS. 2 and 3. With this construction, if the static pressure lever 21 is moved out of its zero position, for example, to the position as shown in FIG. 3, no motion will be transmitted to the first motion transmitting lever 25 because of the fact that the pivotal points at the right-hand ends of the connecting links 29 and 30 are in axial alignment. Similarly, with the static pressure lever in its zero position in which the pivot point 31 overlies the pivot point 24 no motion will be transmitted to the first motion transmitting lever upon movement of the differential pressure lever 23.

FIGS. 3 and 4, however, illustrate how motion can be applied to the first motion transmitting lever 25 by movement of one of the levers 21 or 23 when the other lever 21 or 23 is out of its zero position. For example, with static pressure at a predetermined level present in the pipe line the static pressure lever 21 is pivoted in the counterclockwise direction about its pivot 22. Thereafter, as differential pressure across the orifice plate in the pipe line is increased clockwise movement of the differnetial pressure lever 23 about its pivot 24 will impart movement to the motion transmitting lever 25. Similarly, if the differential pressure lever is maintained stationary out of its zero position, an increase in static pressure and further counterclockwise movement of the static pressure lever 21 will cause further movement of the motion transmitting lever 25.

The multiplying of the movement of the static and differential pressure levers is transmitted by the second motion transmitting lever 26 to a segmental gear 33 fixed to the lever 26 which, through a pinion 34, transmits corresponding movement to the archimedes cam 19 whose surface position at a predetermined point provides an indication of the square root of the product of the differential and the static pressures.

A cam follower 35 adjustably carried by a pivoted arm 36 normally held in a position disengaged from the cam 19 but adapted to be permitted to be moved against the surface of the cam at predetermined time intervals measures the position of the cam 19 and actuates the recording and totalizing unit 18.

The recording and totalizing unit 18 includes conventional clock mechanism which, for example, may be operated by a spring wound at regular intervals by electric batteries. The clock mechanism controls movement of a rotary cam 38 which, at predetermined intervals, is caused to make a single revolution. For example, in the present embodiment of this invention the cam 38 rotates once every five seconds. Rotatably mounted on the face of the clock mechanism is a large toothed wheel 39 which carries a pinion 40 and, through a gear train 41, causes rotation of the drive shaft 42 of the cumulative counter 16.

Rotary movement is imparted to the toothed wheel 39 upon each rotation of the cam 38 in accordance with the position of the archimedes cam 19. This is accomplished in the present invention by an arm 43 mounted for pivotal movement about the axis of the wheel 39 which in turn is pivotally connected at 44a to a connecting link 44 that is in turn pivotally connected at 44b to the arm 36 which carries the cam follower 35. The cam 38 normally engages the arm 43 and maintains it in its elevated position as shown in FIG. 2. In this position of the arm 43 the cam follower 35 is out of engagement with the surface of the involute cam 19. Upon rotation of the cam 38 the arm 43 is permitted to pivot in the clockwise direction relative to FIG. 2 and pulling the cam follower 35 into engagement with the cam 19. Further downward pivotal movement of the arm 43 is prevented when the cam follower engages the cam 19. Thus, the position of the involute cam 19 controls the amount of rotation of the arm 43 about its axis. The left-hand end of the arm 43, relative to FIG. 2, carries a ratchet 45 which engages the teeth of the wheel 39, and rotates the wheel as the arm 43 is returned to its elevated position by the cam 38. Stationary ratchets 46 prevent movement of the wheel 39 in the opposite direction.

In accordance with the present invention, means are provided to prevent the cumulative counter from recording existence of flow through the pipe line when there is zero differential pressure across the meter orifice and the differential pressure lever is in its zero position as shown in FIG. 2. As set forth previously, because of clearance which must be present in the pivotal connections for the lever system and the gear drive for the involute cam 19, it is possible for there to be a slight clearance between the cam follower 35 and the surface of the cam 19 at the zero flow condition. To prevent an input to the cumulative counter upon rotation of the cam 38 when the differential pressure lever is in its zero position, an adjustable stop member 47 is provided which at the zero position of the differential pressure lever is interposed in the path of travel of a downwardly projecting extension 48 of the pivoted arm 43. Movement of the differential pressure lever out of its zero position simultaneously causes movement of the adjustable stop out of the path of travel of the arm extension 48 thereby permitting movement of the arm 43 and corresponding input to the cumulative counter 16.

Figure 6:
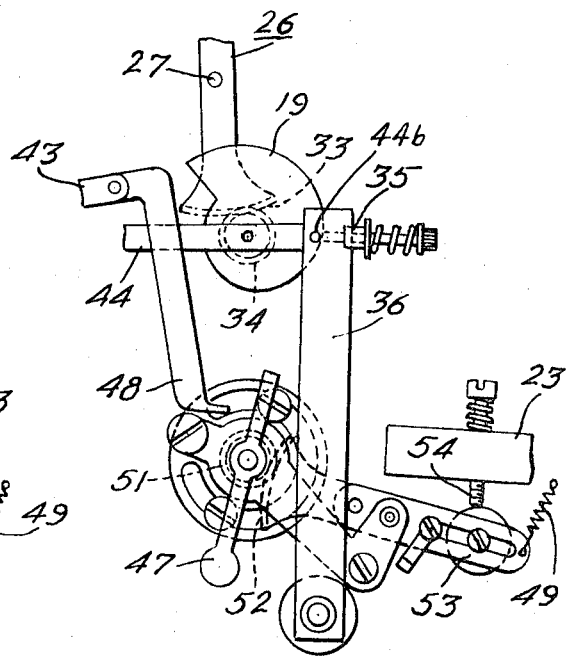
FIG. 6 is a view similar to FIG. 5 in a position permitting recording of flow.

The adjustable stop 47 is mounted for pivoted movement about a shaft and is normally urged to a position out of the path of travel of the arm extension 48 by means of a conventional spring 49. While a tension spring has been shown to normally urge the adjustable stop out of its zero position, a torsion spring mounted about the shaft carrying the adjustable stop may be used to accomplish this purpose. The shaft mounting the stop 47 carries a pinion 51 mounted in engagement with a segmental gear 52 carried by a pivoted arm 53. An adjustable stop member 54 is carried at the end of the differential pressure lever 23 and adapted to engage the arm 53 when the differential pressure lever 23 is in its zero position to thereby move the arm 53 to the position as shown in FIG. 2 and cause the gear segment 52 to rotate a stop member 47 to a position in the path of travel of the arm extension 48. Upon movement of the differential pressure lever 23 out of its zero position the arm 53 is permitted to move in the counterclockwise direction about its pivot thereby rotating the stop member 47 to a position as shown in FIG. 6 out of the path of travel of the arm exension 48. In this position the rotary arm 43 is free to drop downwardly when released by the cam 38 and an indication of the quantity of flow may be registered on the cumulative counter 16.

From the foregoing it will be observed that the present invention provides novel apparatus for integrating and recording total quantity of flow of fluid through a pipe line and will further positively prevent registration of flow of fluid when no such flow exists.

While a particular embodiment of the present invention has been illustrated and described herein, it is apparent that various modifications may be incorporated and embodied in this structure.

I claim:

1. Apparatus for integrating measurements of flow of a fluid passing through an orifice and recording total quantity of the flow over a period of time comprising: an element movable in response to measured flow rate of a fluid, first measuring means to measure differential pressure of the fluid across the orifice, said first measuring means including a first measurement responsive member movable away from a first limit position at zero differential pressure of the fluid across said orifice to a second position proportional to the differential pressure of the fluid across said orifice, a second measuring means to measure static pressure of the fluid, said second measuring means including a second measurement responsive member movable away from a first limit position at zero static pressure of the fluid to a second position proportional to the static pressure of the fluid, means interconnecting said first and said second measurement responsive members with said element operable to move said element an amount proportional to the measurement of the flow rate of the fluid upon movement of both said first and second measurement responsive members away from their first limit positions, recording means interconnected with said element operable in response to the position of said element at predetermined intervals to record total quantity of flow of the fluid, said recording means including a first member movable at said predetermined intervals from a predetermined first position to a second position determined by the position of said element, the quantity of flow of fluid recorded by said recording means being determined by the movement of said first member from said first predetermined position to said second position, and means controlled by said first measuring means to prevent movement of said first member away from said first predetermined position when no differential pressure exists across said orifice.

2. Apparatus in accordance with claim 1 in which the means controlled by said first measuring means comprises a second member mounted for movement between opposite limit positions, said second member in one limit position thereof adapted to engage said first movable member and prevent operation thereof and in the other limit position thereof to be disengaged from said first movable member, said second member being movable to said one limit position when said first measurement responsive member is in its said first limit position.

3. Apparatus in accordance with claim 2 wherein said second measurement responsive member includes a pivoted static pressure lever movable in response to measurement of static pressure and said first measurement responsive member includes a pivoted differential pressure lever movable in response to measurement of differential pressure, and said interconnecting means interconnects both said levers with said movable element to position said element.

4. Apparatus in accordance with claim 2 in which the said first movable member comprises an arm movable at predetermined intervals into engagement with said element to sense the position of said element, and said second member is in engagement with said arm when said second member is in said one limit position to prevent said movement of said arm.

5. Apparatus in accordance with claim 2 in which spring means is provided normally urging said second member toward said other limit position.

* * * * *